United States Patent
Carpenter et al.

(10) Patent No.: US 6,181,030 B1
(45) Date of Patent: Jan. 30, 2001

(54) COMPUTER POWER SUPPLY SYSTEM HAVING SWITCHED REMOTE VOLTAGE SENSING AND SENSE VOLTAGE AVERAGING FOR HOT PLUGGABLE ADAPTER CARDS

(75) Inventors: Brian Ashley Carpenter, Cary; Thomas Dale Ivins, Apex, both of NC (US)

(73) Assignee: International Business Machines Corporation, Armonk, NY (US)

(*) Notice: Under 35 U.S.C. 154(b), the term of this patent shall be extended for 0 days.

(21) Appl. No.: 09/281,166

(22) Filed: Mar. 30, 1999

(51) Int. Cl.[7] .................................................. H01H 7/00

(52) U.S. Cl. ............................................ 307/113; 307/141

(58) Field of Search .................................... 439/105, 119, 439/300, 124, 292, 236; 307/113, 147; 710/103

(56) References Cited

U.S. PATENT DOCUMENTS

| | | | |
|---|---|---|---|
| 5,894,561 | * | 6/1999 | Kuan et al. ............................ 395/283 |
| 5,910,690 | * | 6/1999 | Dorsey et al. ........................ 307/141 |

\* cited by examiner

*Primary Examiner*—Josie Ballato
*Assistant Examiner*—Robert L. Deberadinis
(74) *Attorney, Agent, or Firm*—Martin J. McKinley

(57) ABSTRACT

In a computer system in which adapter cards can be "hot plugged" into an I/O bus connector, a serially connected resistor and "voltage feedback" switch is coupled between the power supply pin of each I/O connector and the power supply input port that regulates the voltage at the output port of the power supply. Another resistor, which has a resistance greater than each of the resistors coupled to the I/O connectors, is connected between the input and output ports of the power supply to provide voltage feedback to regulate the output voltage of the power supply in the event that power to all of the I/O connectors is switched OFF. The power to an individual I/O connector is turned OFF before an adapter card is plugged into or removed from an I/O connector, and the power is turned ON immediately after the card is plugged into the connector. Each of the voltage feedback switches is turned ON by a controller a short time after the power to the I/O connector is switched ON, and each of the feedback switches is turned OFF shortly before power to the I/O connector is turned OFF. When power is turned ON to more than one I/O connector, the voltage at the input port of the power supply is the average of the voltages at the power supply pins of the I/O connectors that are turned ON. This switched, feedback arrangement permits the average power supply voltage at the individual I/O connectors to be held within a close tolerance of "spec", and the deviation of the voltage at any one I/O connector from "spec" to be minimal.

3 Claims, 3 Drawing Sheets

COMPUTER POWER SUPPLY SYSTEM HAVING SWITCHED REMOTE VOLTAGE SENSING AND SENSE VOLTAGE AVERAGING FOR HOT PLUGGABLE ADAPTER CARDS

BACKGROUND OF THE INVENTION

This invention pertains to computers and other information handling systems and, more particularly, to a power supply system for use with hot pluggable adapter cards in which a circuit averages the voltages at the power supply pins of the active I/O bus connectors to regulate the output voltage of the power supply, and in which the feedback voltage from the power supply pins of the I/O connectors to the input port of the power supply is switched ON or OFF at appropriate times.

FIG. 1 is a schematic diagram of a prior art computer system. Referring to this figure, power supply 101 is a well known power supply having a voltage output port Vout, a ground terminal GND, and two input ports Vsense+ and Vsense− for receiving a sense voltage that controls the voltage at the output port Vout. A resistor 102 and series connected FET switch 103 having a control input 103a are connected to the positive power supply pin 104a of a well known I/O bus connector 104, to which a well known adapter card can be attached. In the typical prior art system, more than one I/O connector is usually included and connected to power supply 101 in a manner similar to that of connector 104. The negative power supply pin 104b of connector 104 is connected to ground. The two terminals of the "current sensing" resistor 102 are connected to two Isense input terminals of a well known hot plug controller 105. The voltage drop across resistor 102 is proportional to the power supply current flowing into the adapter card plugged into connector 104 and this voltage drop can be used by hot plug controller 105 to sense the presence of an adapter card in the "slot", and to provide over current protection. The power supply voltage at pin 104a is connected to a Vsense input of hot plug controller 105. A control output port of hot plug controller 105 is connected to the control input 103a of switch 103 and turns the switch OFF just before an adapter card is plugged into or removed from connector 104, and turns the switch ON just after the adapter card is plugged into the slot.

While the prior art power supply system may work well when only one adapter card is connected to the I/O bus, unacceptable variations in the power supply voltage at the power supply pins of the various I/O connectors in the system can result, particularly if there is a significant difference in the power consumed by the various adapter cards. These unacceptable variations in power supply voltage can be deviations from the ideal or "spec" power supply voltage, as well as variations in the power supply voltage from one adapter card to the next. Accordingly, the invention described below regulates the power supply voltage such that the average voltage at the power supply pins of the active I/O connectors is within close tolerances of "spec", and such that the deviation of the power supply voltage at any one I/O connector from spec is minimal.

SUMMARY OF THE INVENTION

Briefly, the invention is an information handling system including a bus having a first connector for the attachment of an adapter card, wherein the first connector includes a power supply voltage pin. A power supply has an output port and a sense voltage input port, wherein the voltage at the sense voltage input port controls the voltage at the output port of the power supply. A first switch is coupled between the output port of the power supply and the power supply voltage pin of the first connector. The first switch includes a control port. A first resistor is coupled between the output port of the power supply and the sense voltage input port, such that the first resistor provides sense voltage feedback to the sense voltage input port of the power supply. A second resistor has a first end coupled to the power supply pin of the first connector. A second switch is coupled between a second end of the second resistor and the sense voltage input port of the power supply. The second switch also includes a control port. The second resistor provides sense voltage feedback to the sense voltage input port of the power supply when the second switch is ON. Control circuitry includes a first output coupled to the control input of the first switch, and a second output coupled to the control input of the second switch. The control circuitry activates the first switch to provide power to the first connector subsequent to the attachment of an adapter card to the first connector, and the control circuitry deactivates the first switch to remove power from the first connector prior to the removal of an adapter card from the first connector. The control circuitry delays the activation of the second switch until after the first switch has been activated, and the control circuitry delays the deactivation of the first switch until after the second switch has been deactivated.

In another embodiment, the invention further includes a second connector for the attachment of another adapter card. The second connector also includes a power supply voltage pin. A third resistor has a first end coupled to the power supply pin of the second connector. A third switch is coupled between a second end of the third resistor and the sense voltage input port of the power supply. The third switch also includes a control port. The third resistor provides sense voltage feedback to the sense voltage input port of the power supply when the third switch is ON. When the second and third switches are ON, the sense voltage at the sense voltage input port of the power supply is a function of the average of the voltages at the power supply pins of the first and second connectors.

DESCRIPTION OF THE ILLUSTRATIVE EMBODIMENTS

Figure 1:
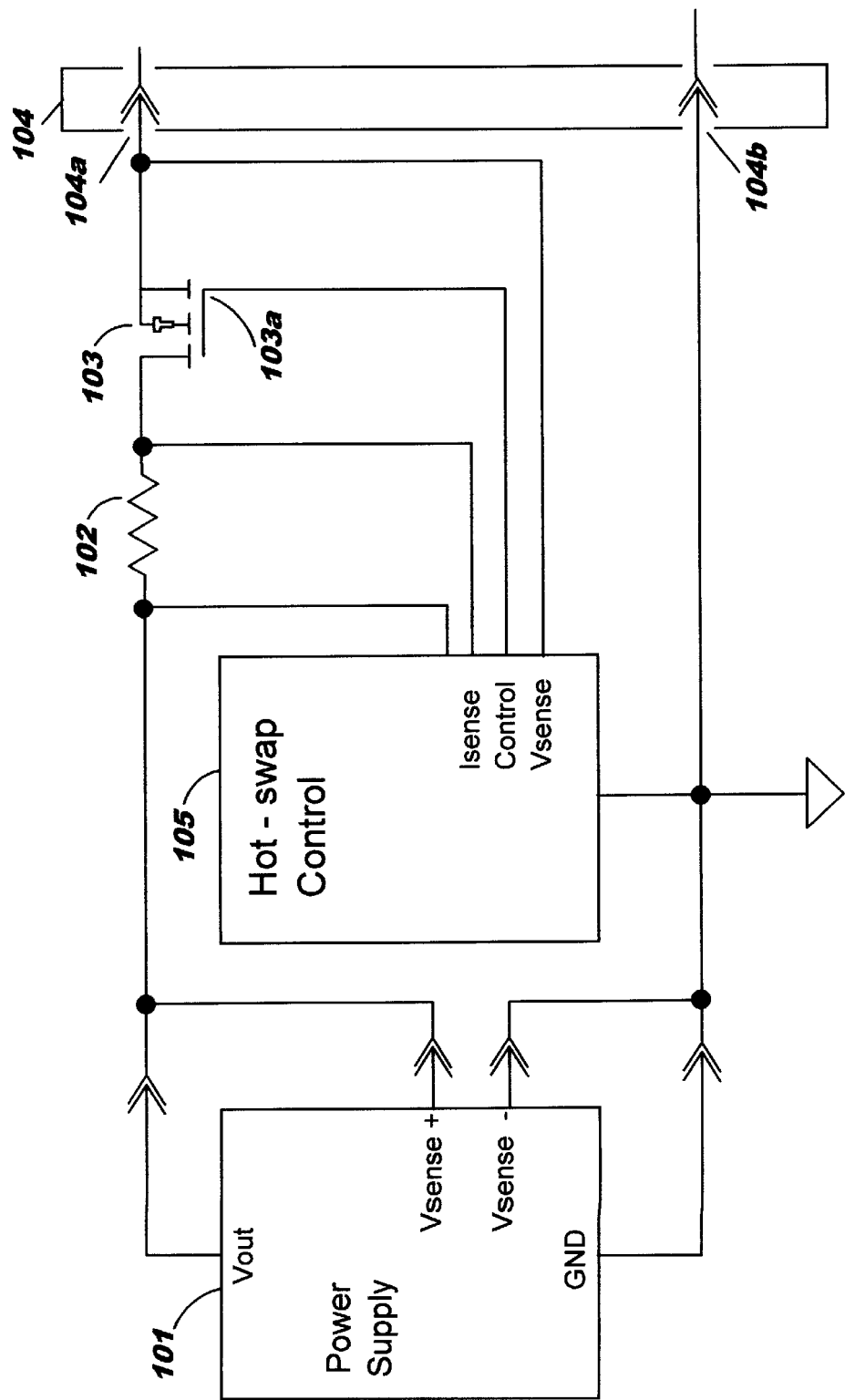
FIG. 1 is a schematic diagram of a prior art computer system including a power supply, a hot pluggable I/O bus, and control circuitry for disabling power to a selected slot on the I/O bus.
Figure 2:
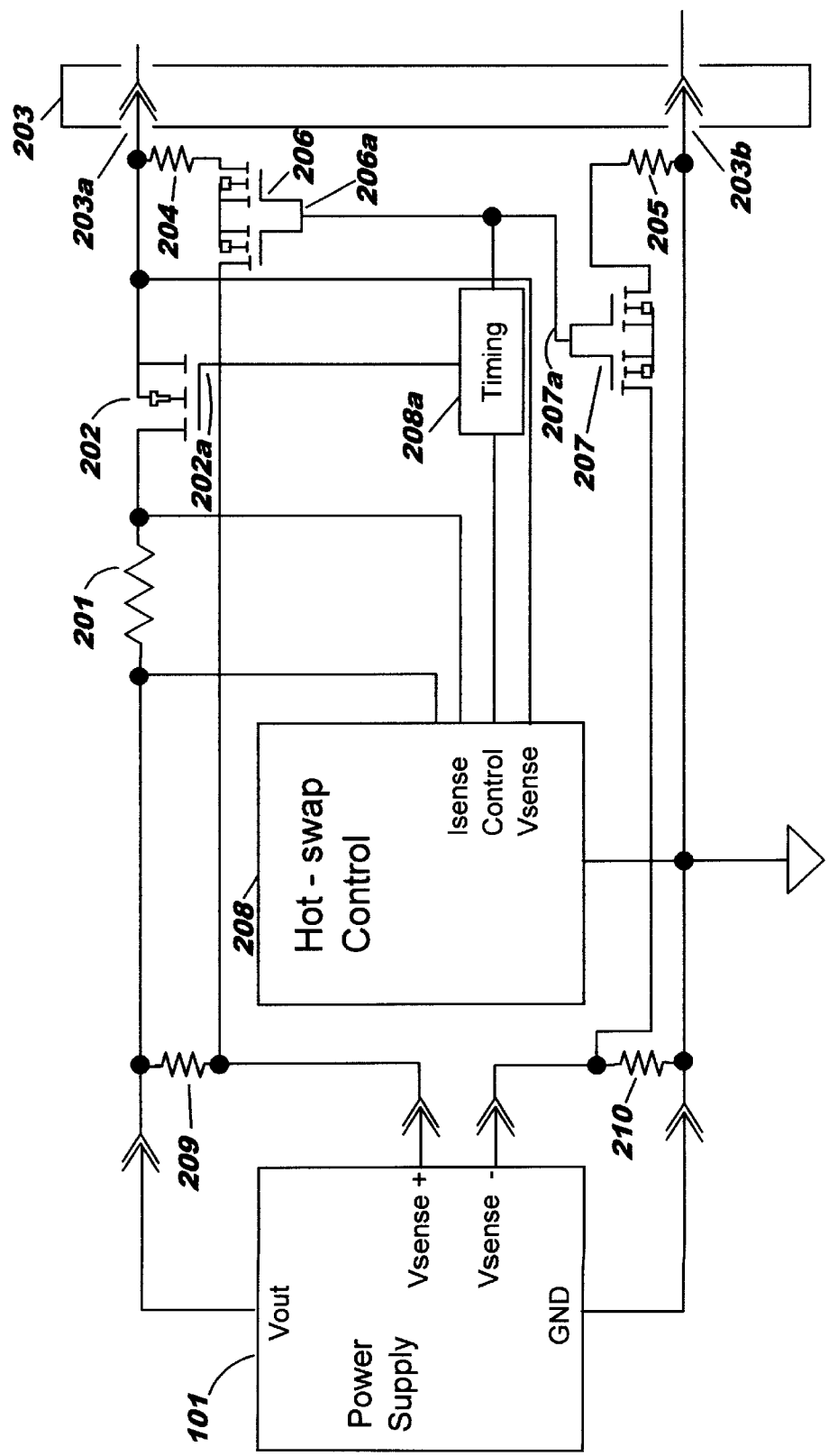
FIG. 2 is a schematic diagram of a computer system of the present invention that includes power supply voltage sensing at the I/O connector and in which the feedback voltage from the power supply pin of the I/O connector to the input port of the power supply is switched ON or OFF at appropriate times by a controller.

FIG. 2 is a schematic diagram of a computer or other information handling system of the present invention. Referring to this figure, the output terminal Vout of power supply 101 is coupled to the power supply pin 203a of a well known I/O bus connector 203 through series connected resistor 201 and FET switch 202. A resistor 204 and a series connected bi-directional FET switch 206 feed back the voltage at the power supply pin 203a to the Vsense+ input of power supply 101. On the negative power supply pin 203b, a similar series connected resistor 205 and bi-directional switch 207 feed back the voltage on pin 203b to the Vsense− of power supply 101. A resistor 209 couples the voltage output terminal Vout of power supply 101 back to the Vsense+ input. Similarly, resistor 210 couples the groung terminal GND of power supply 101 back to the Vsense− input. Preferably, resistors 209 and 210 are in the range of 100 to 1000 Ohms, while resistors 204 and 205 are in the range of 1 to 10 Ohms. Whatever resistances are selected for resistors 204, 205, 209 and 210, the resistance of resistors 209 and 210 should be much larger than that of resistors 204 and 205 and a resistance on the order of 100 times more is preferred.

A well known hot plug controller 208 turns the power to I/O connector 203 OFF prior to the insertion of an adapter card into, or the removal of an adapter card from the I/O connector. This power switching is usually initiated in a well known manner by the use of a manually operated switch that blocks the I/O "slot" when the switch is in one position, and permits insertion or removal of an adapter card into the slot when the switch is in the other position. Consequently, the user must "flip" the switch prior to the insertion of an adapter card into the I/O connector, and then flip the switch back after the adapter card has been inserted into the slot.

Timing circuit 208a, which is connected to the control inputs 206a and 207a of the bi-directional "sense voltage" switches 206 and 207, turns these switches OFF immediately before hot plug controller 208 turns switch 202 OFF. If switches 206 and 207 were not in the system, i.e., if resistors 204 and 205 were connected directly back to the Vsense inputs of power supply 101, the voltage on the power supply pins, e.g., pin 203a, would gradually decay from V+ to zero due to the capacitance of the adapter card. Consequently, the purpose of the de-activation of sense voltage switches 206 and 207 prior to the de-activation of switch 202 is to prevent an erroneous sense voltage from being fed back to the Vsense inputs of the power supply after switch 202 is turned OFF.

Similarly, timing circuit 208a turns the sense voltage switches 206 and 207 ON immediately after hot plug controller 208 turns switch 202 ON. This delay between the activation of switch 202 and the activation of sense voltage switches 206 and 207 need only be long enough so that the voltage on the power supply pins 203a and 203b stabilizes before the sense voltage is coupled back to the Vsense inputs of power supply 101. If this delay between the activation of switch 202 and the activation of sense voltage switches 206 and 207 were not present, an unstable sense voltage could be temporarily fed back to the Vsense inputs of the power supply with unpredictable effects on the output voltage at Vout. Timing circuit 208a can be implemented digitally using a well known programmable controller, or it can be implemented using analog circuitry of resistors, capacitors and diodes.

As discussed above, when switch 202 is OFF, the sense voltage feedback to the Vsense input of the power supply is also switched OFF by switches 206 and 207. Consequently, if resistors 209 and 210 were removed from the circuit, the Vsense inputs of power supply 101 would be floating any time switch 202 was OFF, with unpredictable results on the output voltage (Vout) of the power supply. Therefore, resistors 209 and 210 provide feedback to "close the loop" to the Vsense inputs anytime switch 202 is OFF. Because resistors 209 and 210 are selected to have a resistance much greater (100 times is preferred) than the resistance of resistors 204 and 205, resistors 209 and 210 have a negligible effect on the Vsense voltage anytime switches 206 and 207 are ON.

Figure 3:
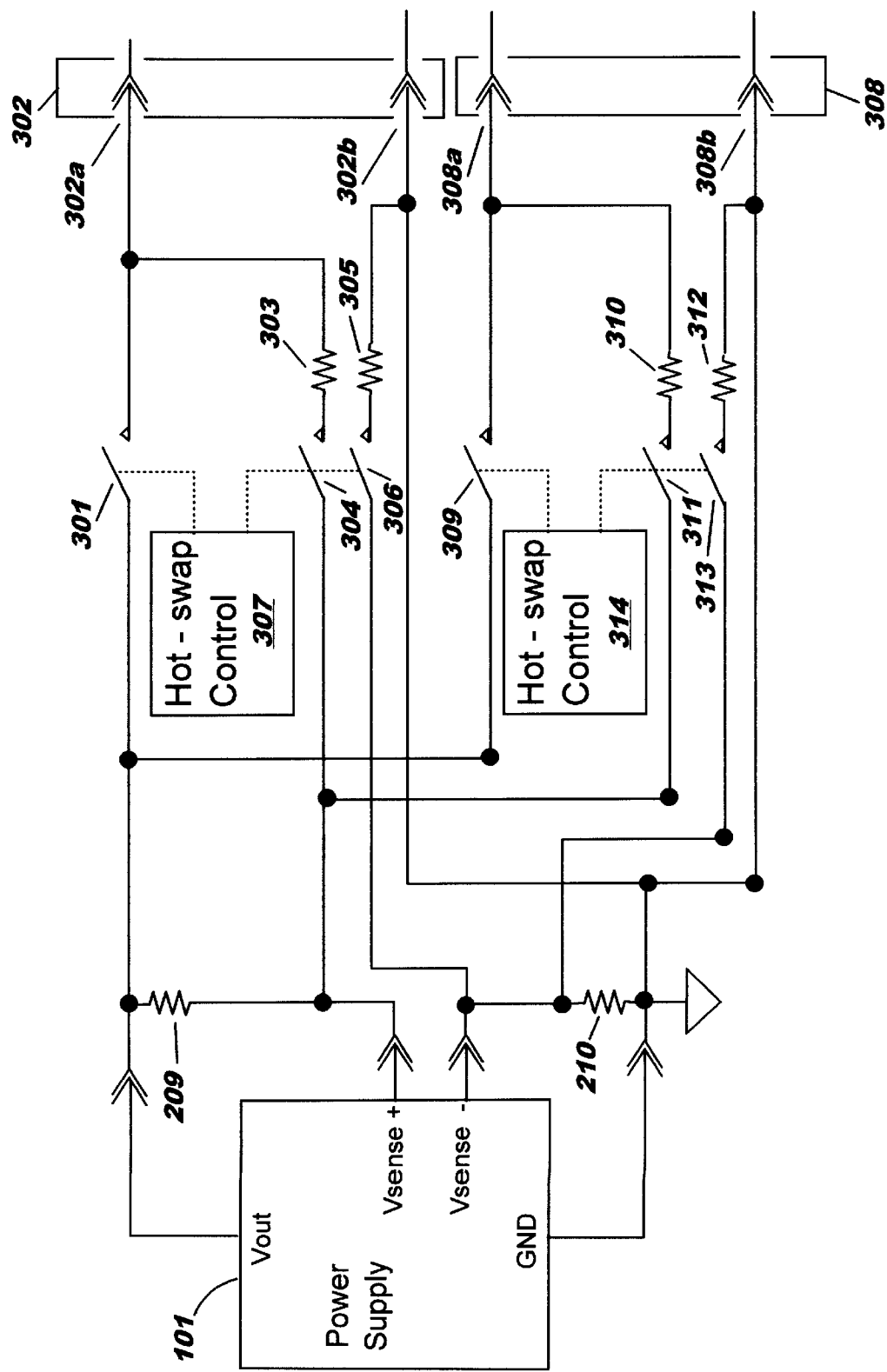
FIG. 3 is a schematic diagram of a computer system, which is similar to FIG. 2, but in which the voltages from the power supply pins of the two I/O connectors are averaged and then fed back to the input port of the power supply.

FIG. 3 is a schematic diagram of a computer system having more than one I/O connector. Referring to this figure, switches 301 and 309 are similar to switch 202 of FIG. 2, and bi-directional sense voltage switches 304, 306, 311 and 313 are similar to switches 206 and 207 of FIG. 2. Feedback resistors 303, 305, 310 and 312 are similar to resistors 204 and 205 of FIG. 2. Hot plug controllers 307 and 314 are similar to controller 208 of FIG. 2, but also include the timing function 208a. Unlike FIG. 2, the system of FIG. 3 includes more than one I/O connector 302 and 308 and, consequently, has a sense a voltage feedback path from each of the power supply pins (302a, 302b, 308a and 308b) of connectors 302 and 308 to the Vsense inputs of power supply 101. Thus, when both I/O connectors 302 and 308 are active (i.e., switches 301 or 309 are both ON), resistors 303 and 310, as well as resistor 305 and 312, form a voltage averaging circuit, such that the average sense voltage at the I/O connector power supply pins is fed back to the Vsense inputs that regulate the output voltage of the power supply. Consequently, the average voltage at the power supply pins, e.g., 302a and 308a, can be set to be very close to "spec", with the individual voltages on the connector power supply pins varying by some small tolerance + or − from this average voltage. It should also be noted that the system of FIG. 3 can be easily expanded to include more than 2 I/O connectors, and such a system will also average the sense voltages of all the active I/O connectors, even if more than 2 connectors are active at any one time.

It should also be noted that while the systems of FIG. 2 and FIG. 3 shows the switching of both the positive and negative sense voltages, a system could be designed to operate wherein only one of the sense voltages was switched. In FIG. 2, for example, resistor 205 and switch 207 could be eliminated and the Vsense− line tied to ground. Furthermore, the term "adapter card" is used throughout the specification and claims to indicate any sub-system that can be attached to and detached from a bus or other connector of a computer or other information processing system.

We claim as our invention:

1. An information handling system, comprising:

a bus having a first connector for the attachment of an adapter card, said first connector including a power supply voltage pin;

a power supply having an output port and a sense voltage input port, the voltage at the sense voltage input port controlling the voltage at the output port of said power supply;

a first switch coupled between the output port of said power supply and the power supply voltage pin of said first connector, said first switch including a control port;

a first resistor coupled between the output port of said power supply and the sense voltage input port of said power supply, such that said first resistor provides sense voltage feedback to the sense voltage input port of said power supply;

a second resistor having a first end coupled to the power supply pin of said first connector;

a second switch coupled between a second end of said second resistor and the sense voltage input port of said power supply, said second switch including a control port, said second resistor providing sense voltage feedback to the sense voltage input port of said power supply when said second switch is on; and control circuitry having a first output coupled to the control input of said first switch, and a second output coupled to the control input of said second switch, said control circuitry activating said first switch to provide power to said first connector subsequent to the attachment of an adapter card to said first connector, and deactivating said first switch to remove power from said first connector prior to the removal of an adapter card from said first connector, said control circuitry delaying the activation of said second switch until after said first switch has been activated, said control circuitry delaying the deactivation of said first switch until after said second switch has been deactivated.

2. The information handling system of claim 1, further comprising:

a second connector for the attachment of an adapter card, said second connector including a power supply voltage pin;

a third resistor having a first end coupled to the power supply pin of said second connector;

a third switch coupled between a second end of said third resistor and the sense voltage input port of said power supply, said third switch including a control port, said third resistor providing sense voltage feedback to the sense voltage input port of said power supply when said third switch is on;

such that, when said second and third switches are on, the sense voltage at the sense voltage input port of said power supply is a function of the average of the voltages at the power supply pins of said first and second connectors.

3. The information handling system of claim 1, wherein:

the resistance of said second resistor is less than the resistance of said first resistor;

such that, when said second switch is on, the sense voltage at the sense voltage input port of said power supply is the sum of the voltage at the output port of said power supply multiplied by a first factor, plus the voltage at the power supply pin multiplied by a second factor, wherein the second factor is greater than the first factor.

* * * * *